US 8,854,977 B2

(12) United States Patent
Matoba

(10) Patent No.: US 8,854,977 B2
(45) Date of Patent: Oct. 7, 2014

(54) RELAY NODE

(75) Inventor: Kazumine Matoba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 510 days.

(21) Appl. No.: 13/047,437

(22) Filed: Mar. 14, 2011

(65) Prior Publication Data

US 2011/0235522 A1  Sep. 29, 2011

(30) Foreign Application Priority Data

Mar. 25, 2010  (JP) ................................ 2010-069327

(51) Int. Cl.
*H04L 12/26* (2006.01)
*H04L 12/56* (2006.01)
*H04W 24/00* (2009.01)
*H04L 12/24* (2006.01)
H04L 29/06 (2006.01)

(52) U.S. Cl.
CPC ........ *H04L 43/0817* (2013.01); *H04L 41/0893* (2013.01); *H04L 63/1416* (2013.01)
USPC .......................... 370/241; 370/400; 455/456.1

(58) Field of Classification Search
CPC ..... H04L 41/00; H04L 41/08; H04L 41/0893; H04L 43/00; H04L 43/08; H04L 43/0817; H04L 63/00; H04L 63/14; H04L 63/1408; H04L 63/1416
USPC ............................... 370/241, 400; 455/456.1
See application file for complete search history.

(56) References Cited

U.S. PATENT DOCUMENTS

| 6,094,416 | A  | * | 7/2000 | Ying ............................ 370/222 |
| 6,944,165 | B2 | * | 9/2005 | Fujiyama et al. ............ 370/400 |
| 2003/0092443 | A1 | * | 5/2003 | Hiyama et al. ................ 455/435 |
| 2012/0113835 | A1 | * | 5/2012 | Alon et al. .................... 370/252 |

FOREIGN PATENT DOCUMENTS

JP  09-044534  2/1997

* cited by examiner

*Primary Examiner* — Jung Park
*Assistant Examiner* — Albert Shih
(74) *Attorney, Agent, or Firm* — Fujitsu Patent Center

(57) ABSTRACT

A relay node functions as a master node or a slave node and includes a status monitoring means, an update requesting means, a master transferring means, and a master accepting means. The status monitoring means monitors a status of a connection related to communication data. The update requesting means transmits a first update request to a first node upon the relay node receiving first communication data while the first node functioning as the master node. The master transferring means determines whether to transfer authority of the master node to a second node in accordance with a status of a first connection upon the relay node receiving a second update request from the second node. The master transferring means transmits a first master transfer notification to the second node. The master accepting means prepares to become the master node upon the relay node receiving a second master transfer notification.

14 Claims, 16 Drawing Sheets

| ⌐421 | ⌐422 | ⌐423 | ⌐424 | ⌐425 | ⌐426 | ⌐427 |
|---|---|---|---|---|---|---|
| CLIENT IP | SERVER IP | CLIENT PORT | SERVER PORT | CONNECTION GROUP ID | MASTER NODE | CONNECTION TYPE |
| 10.0.0.1 | 20.0.0.1 | 23435 | 21 | GROUP_1 | NODE_3 | CONTROL |
| --- | 20.0.0.1 | --- | 40051 | GROUP_1 | NODE_3 | DATA |

| ⌐441 | ⌐442 | ⌐443 | ⌐444 | ⌐445 | ⌐446 |
|---|---|---|---|---|---|
| CONNECTION GROUP ID | CLIENT IP | SERVER IP | CLIENT PORT | SERVER PORT | CONNECTION STATUS |
| GROUP_1 | 10.0.0.1 | 20.0.0.1 | 23435 | 21 | ESTABLISHED |

| ⌐461 | ⌐462 | ⌐463 |
|---|---|---|
| CONNECTION GROUP ID | OUTGOING BYTES | REFERENCE TIME |
| GROUP_1 | 7551732 | 1250848929 |
| GROUP_2 | 18321 | 1250848941 |

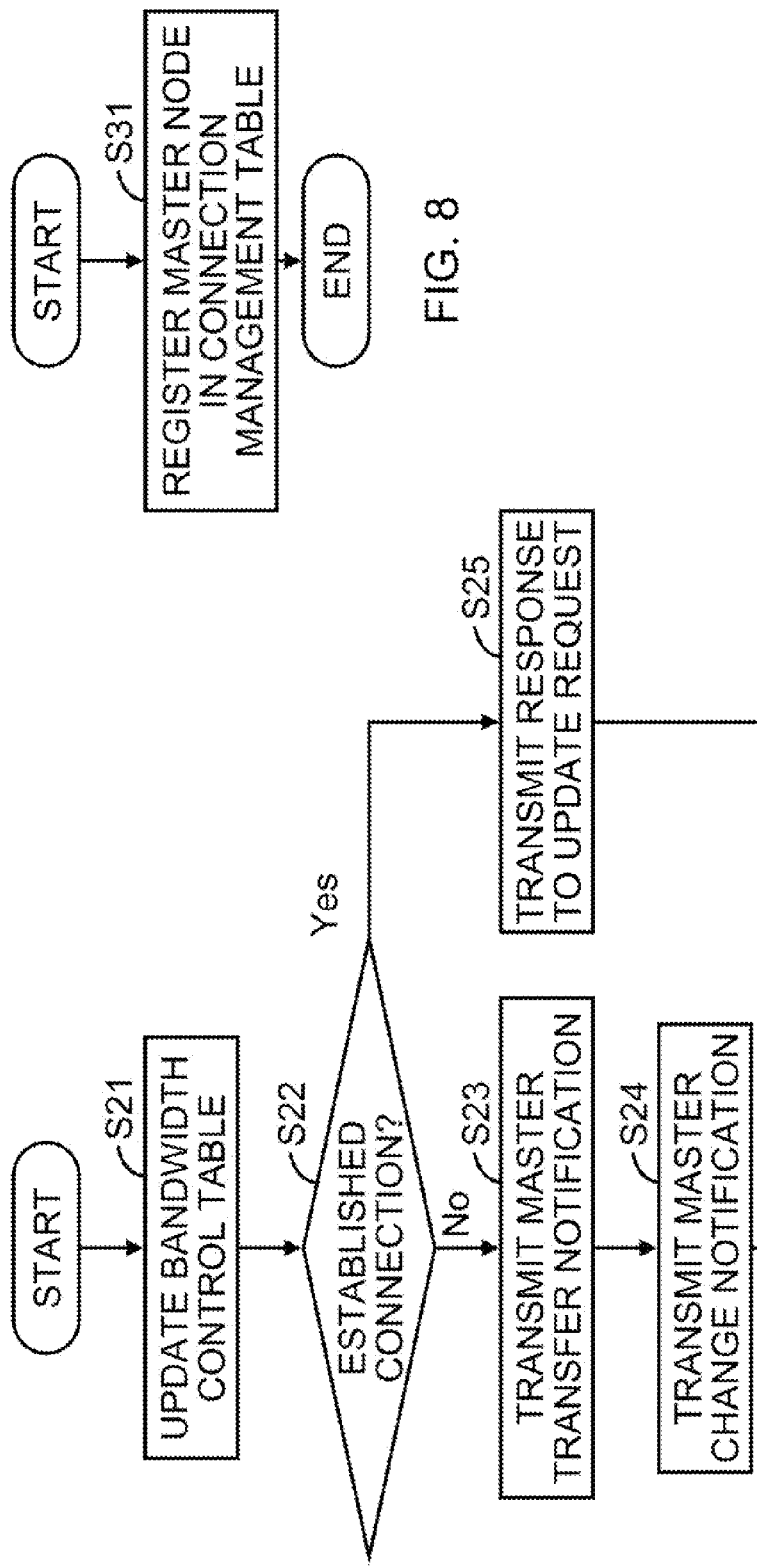

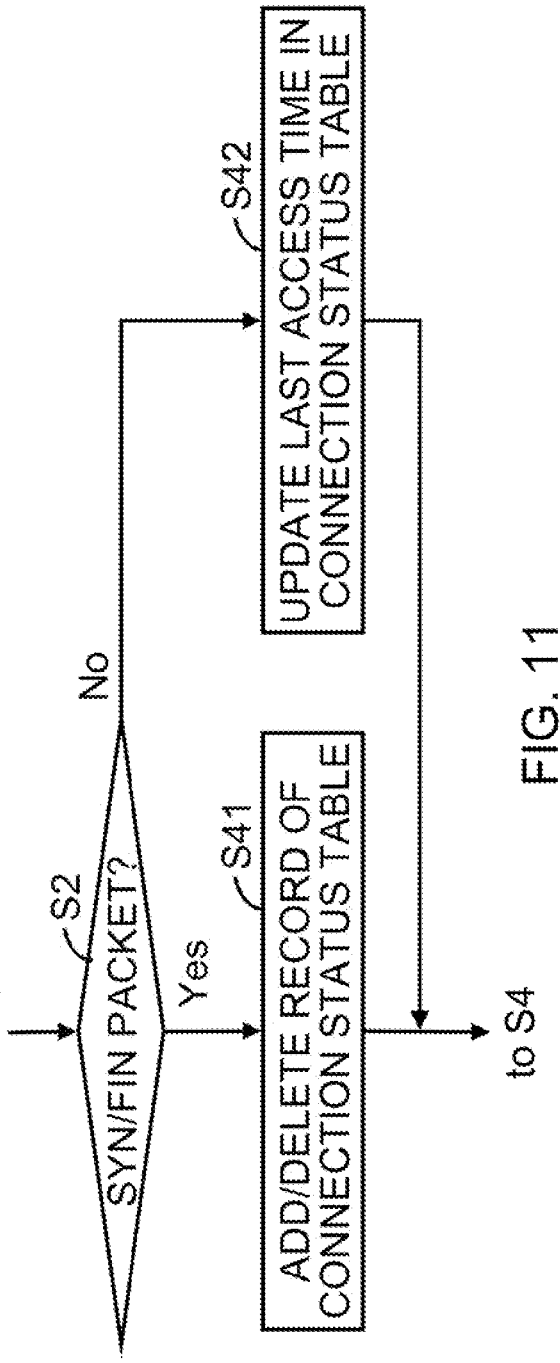

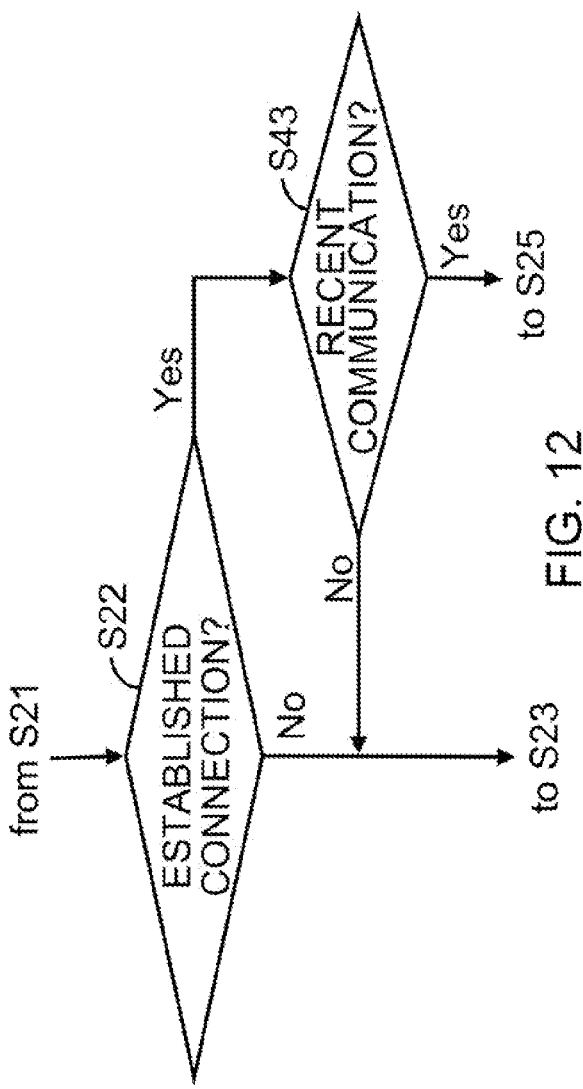

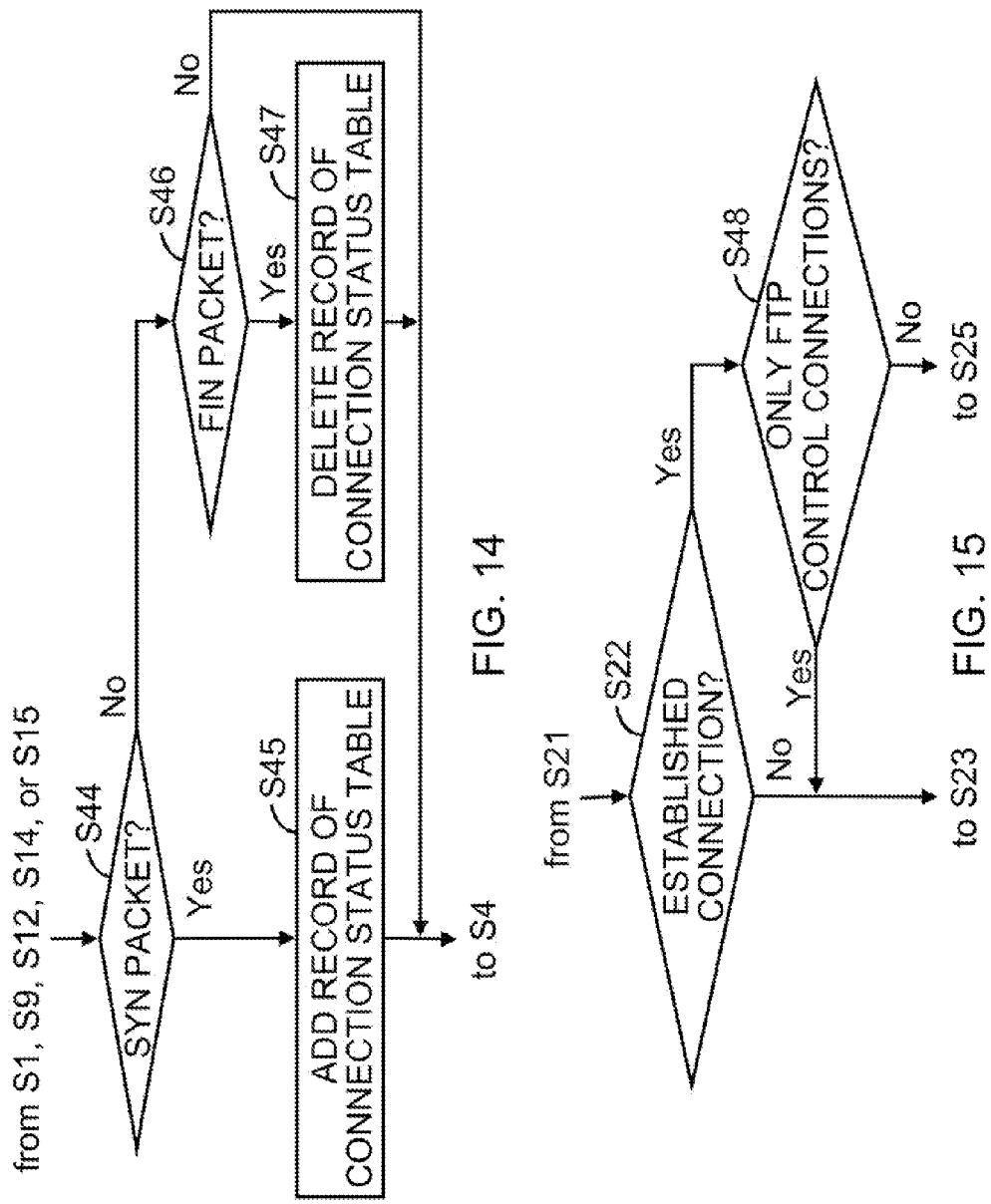

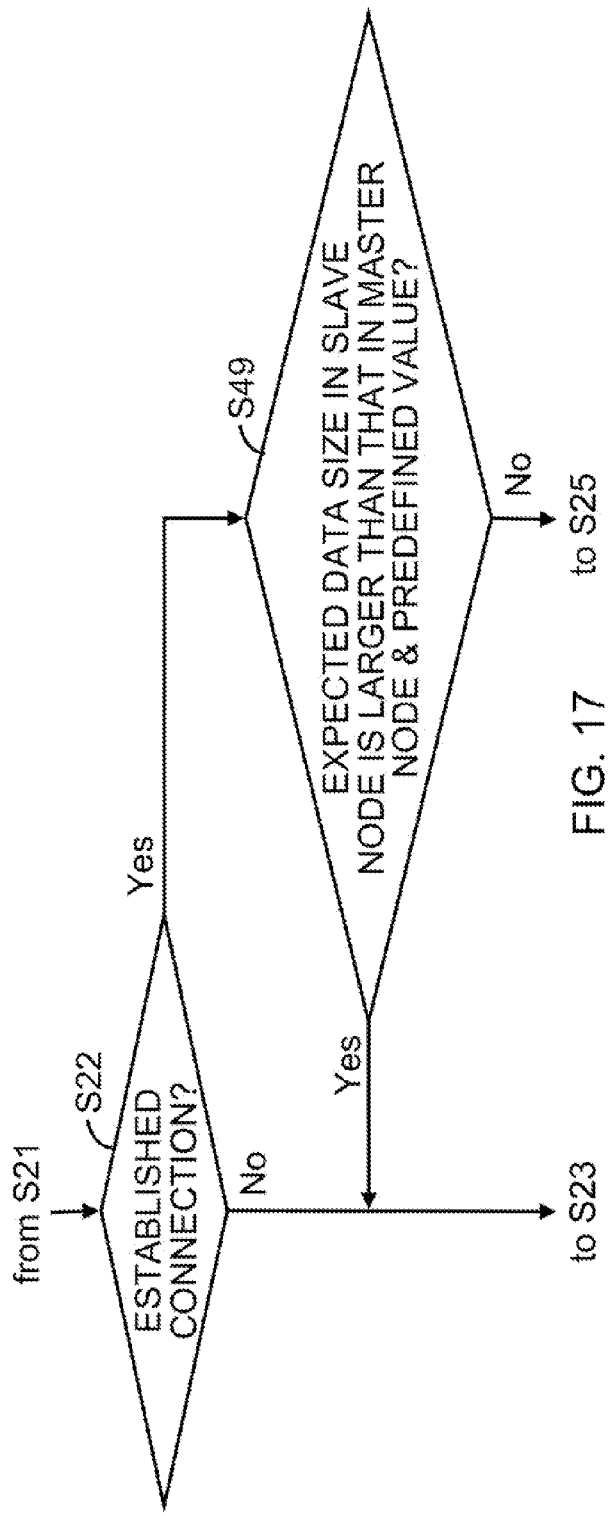

RELAY NODE

CROSS-REFERENCE TO RELATED APPLICATION

This application is based upon and claims the benefit of priority of the prior Japanese Patent Application No. 2010-069327, filed on Mar. 25, 2010, the entire contents of which are incorporated herein by reference.

FIELD

The embodiments discussed herein are related to a technology for relaying communication data.

BACKGROUND

In a computer network, a relay node such as a bandwidth control apparatus, a denial of service (DoS) monitoring apparatus, or an access control apparatus is utilized that performs a relay process while monitoring traffics flowing through the network. Also, in a large-scale computer network, to eliminate a bottleneck in a relay node, a load balancing technology is adopted for distributing communication data such as packets to a plurality of relay nodes by using a distribution node such as a load balancer. In this case, as bandwidth control tables (control data) for the network need to be shared among the plurality of relay nodes, a method is proposed in which one of the relay nodes is set as a master node and the master node carries out centralized management on the control data.

However, in a case where the master node carries out the centralized management on the control data, the other relay nodes functioning as slave nodes needs to transmit to the master node an update request for updating control data for relaying communication data each time the slave node relays the communication data. For this reason, traffics related to the update request flow through the network and overhead irrelevant to the original data communication may increase.

SUMMARY

According an aspect of the present invention, provided is a relay node for managing control data for relaying communication data. The relay node functions as a master node or a slave node. The relay node includes a status monitoring means, an update requesting means, a master transferring means, and a master accepting means. The status monitoring means monitors a status of a connection belonging to a connection group related to the communication data. The update requesting means transmits a first update request to a first node upon the relay node receiving first communication data while the relay node functioning as the slave node. The first update request requests to update first control data for relaying the first communication data. The first node functions as the master node. The master transferring means determines whether to transfer authority of the master node to a second node in accordance with a status of a first connection belonging to a first connection group related to second communication data upon the relay node receiving a second update request from the second node while the relay node functioning as the master node. The second node functions as the slave node. The second update request requests to update second control data for relaying the second communication data. The master transferring means transmits a first master transfer notification to the second node upon determining to transfer the authority of the master node to the second node. The first master transfer notification indicates that the authority of the master node is to be transferred to the second node. The master accepting means prepares for the relay node to become the master node upon the relay node receiving a second master transfer notification while the relay node functioning as the slave node. The second master transfer notification indicates that the authority of the master node is to be transferred to the relay node.

The object and advantages of the invention will be realized and attained by means of the elements and combinations particularly pointed out in the claims. It is to be understood that both the foregoing general discussion and the following detailed discussion are exemplary and explanatory and are not restrictive of the invention, as claimed.

BRIEF DESCRIPTION OF DRAWINGS

FIG. 3 is a diagram illustrating an example of a connection management table according to an embodiment of the present invention;

FIG. 4 is a diagram illustrating an example of a connection status table according to an embodiment of the present invention;

FIG. 5 is a diagram illustrating an example of a bandwidth control table according to an embodiment of the present invention;

FIG. 7 is a diagram illustrating an exemplary operation flow of a process executed by a relay node according to an embodiment of the present invention;

FIG. 8 is a diagram illustrating an exemplary operation flow of a process executed by a relay node according to an embodiment of the present invention;

FIG. 10 is a diagram illustrating an example of a connection status table according to an embodiment of the present invention;

FIG. 11 is a diagram illustrating an exemplary operation flow of a process executed by a relay node according to an embodiment of the present invention;

FIG. 12 is a diagram illustrating an exemplary operation flow of a process executed by a relay node according to an embodiment of the present invention;

FIG. 13 is a diagram illustrating an example of a connection status table according to an embodiment of the present invention;

FIG. 14 is a diagram illustrating an exemplary operation flow of a process executed by a relay node according to an embodiment of the present invention;

FIG. 15 is a diagram illustrating an exemplary operation flow of a process executed by a relay node according to an embodiment of the present invention;

FIG. 16 is a diagram illustrating an example of a connection status table according to an embodiment of the present invention;

FIG. 17 is a diagram illustrating an exemplary operation flow of a process executed by a relay node according to an embodiment of the present invention;

DESCRIPTION OF EMBODIMENTS

Hereinafter, the embodiments will be discussed in detail with reference to the attached drawings.

Figure 1:
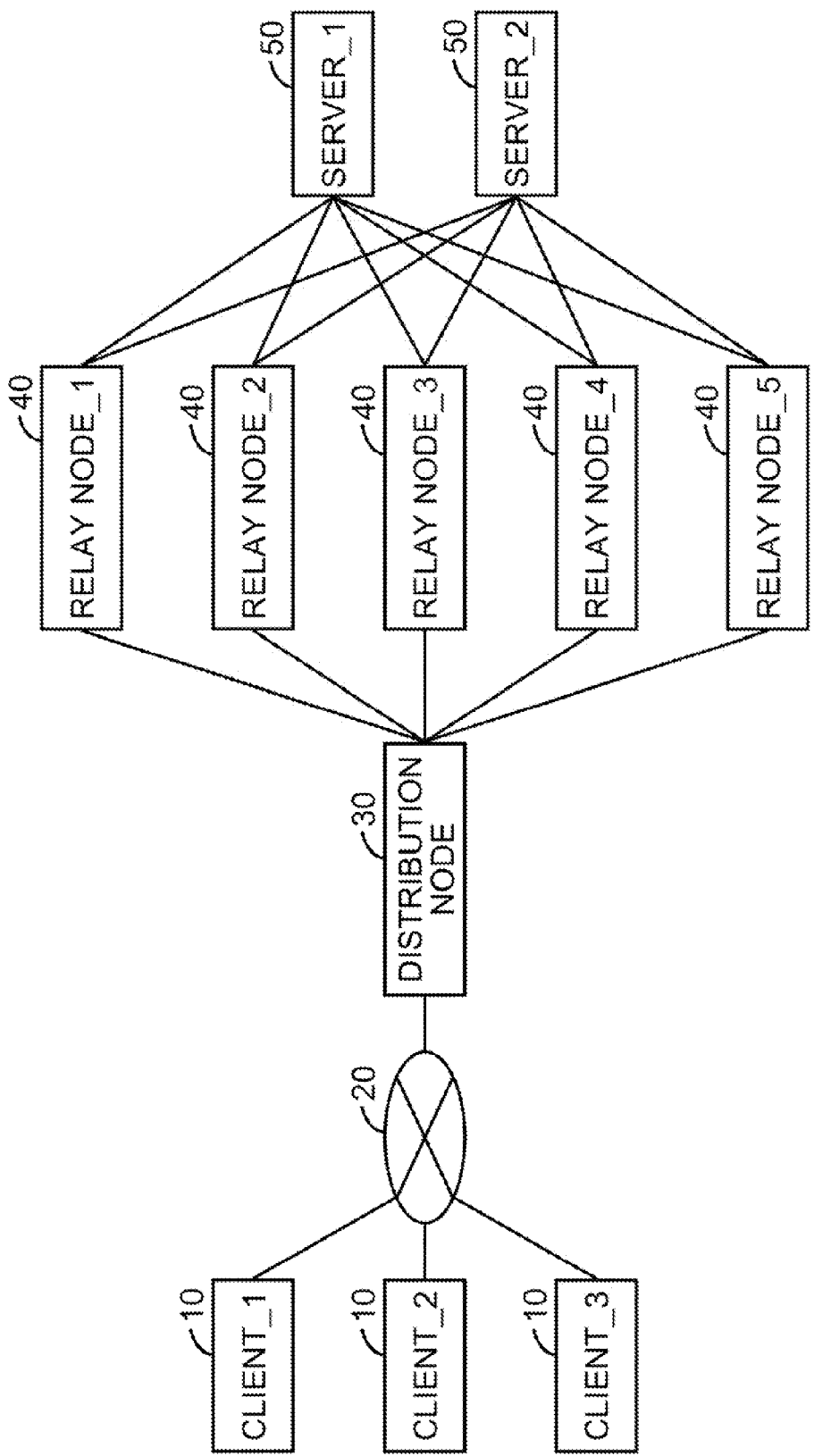
FIG. 1 is a diagram illustrating an exemplary information system according to embodiments of the present invention.

FIG. 1 illustrates an exemplary information system according to embodiments of the present invention.

Figure 19:
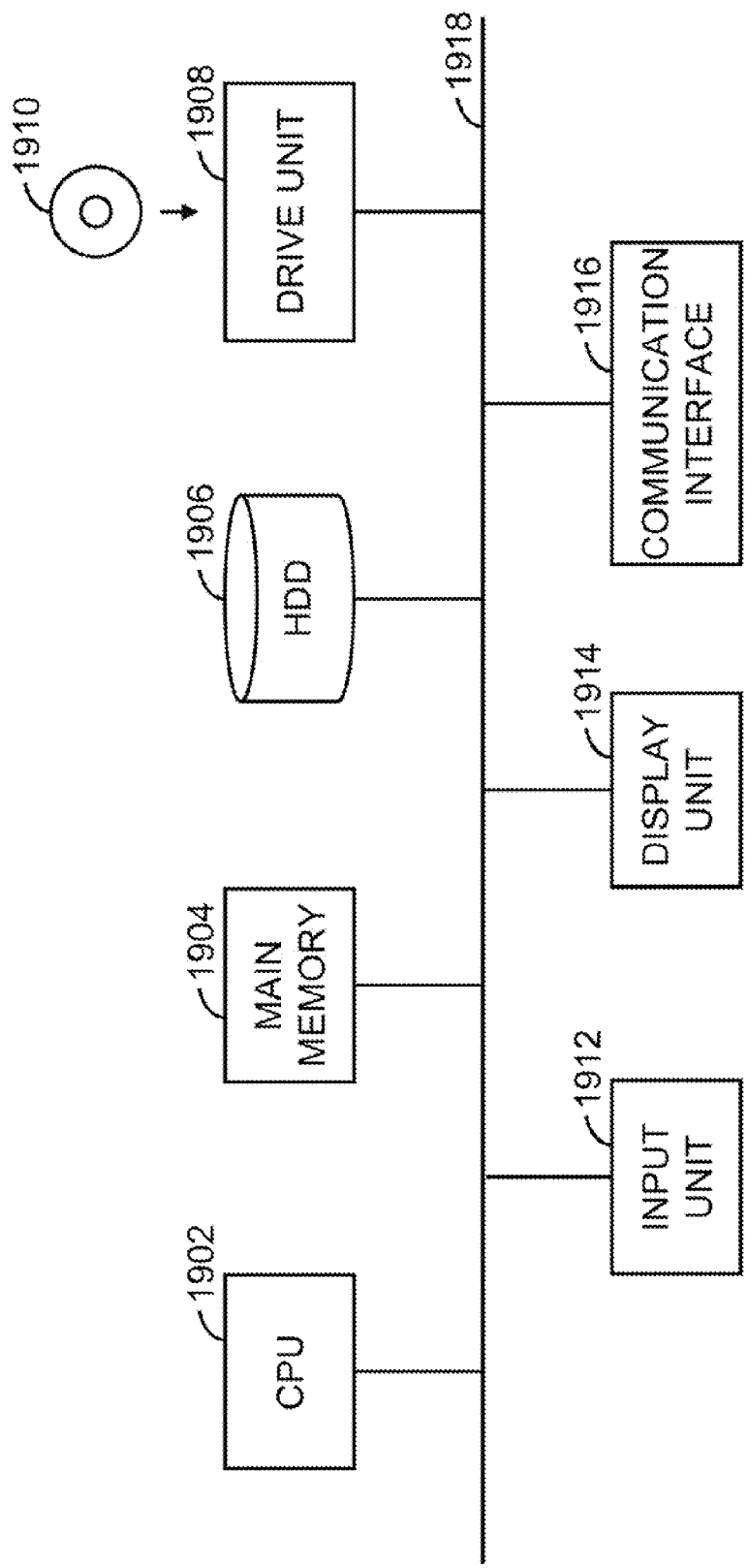
FIG. 19 is a diagram illustrating an exemplary configuration of a computer.

A plurality of clients (in FIG. 1, client_1, client_2, and client_3) 10 are connected via a network 20 such as the internet to a distribution node 30 such as a load balancer that performs load distribution. The distribution node 30 distributes, while following a predefined rule, packets that are an example of the communication data from the client 10 to a plurality of relay nodes (in FIG. 1, relay node_1, relay node_2, relay node_3, relay node_4, and relay node_5) 40 arranged in parallel as a part of the network 20. The relay node 40 is, for example, a node that performs a bandwidth control of the network 20 and is connected to a plurality of servers (in FIG. 1, server_1 and server_2) 50 that treat requests received from the clients 10. The relay node 40 may be realized by a general-purpose computer by executing software. FIG. 19 illustrates an exemplary system configuration of the computer. The computer illustrated in FIG. 19 includes a central processing unit (CPU) 1902 for executing the software such as operating system (OS) and application programs, a main memory 1904 such as a random access memory (RAM) for temporarily storing data, an auxiliary storage such as a hard disk drive (HDD) 1906 for storing data, a drive unit 1908 for reading data from and/or writing data to a removable disk 1910, an input unit 1912 for accepting user input, a display unit 1914 for displaying data, and a communication interface 1916 for establishing a connection to a network. These components are connected to each other via a bus 1918. The software may be stored in the removable disk 1910 when delivered, installed onto the HDD 1906 from the removable disk 1910, and loaded into the main memory 1904 from the HDD 1906 when executed by the CPU 1902. The software may be delivered over the network.

Figure 2:
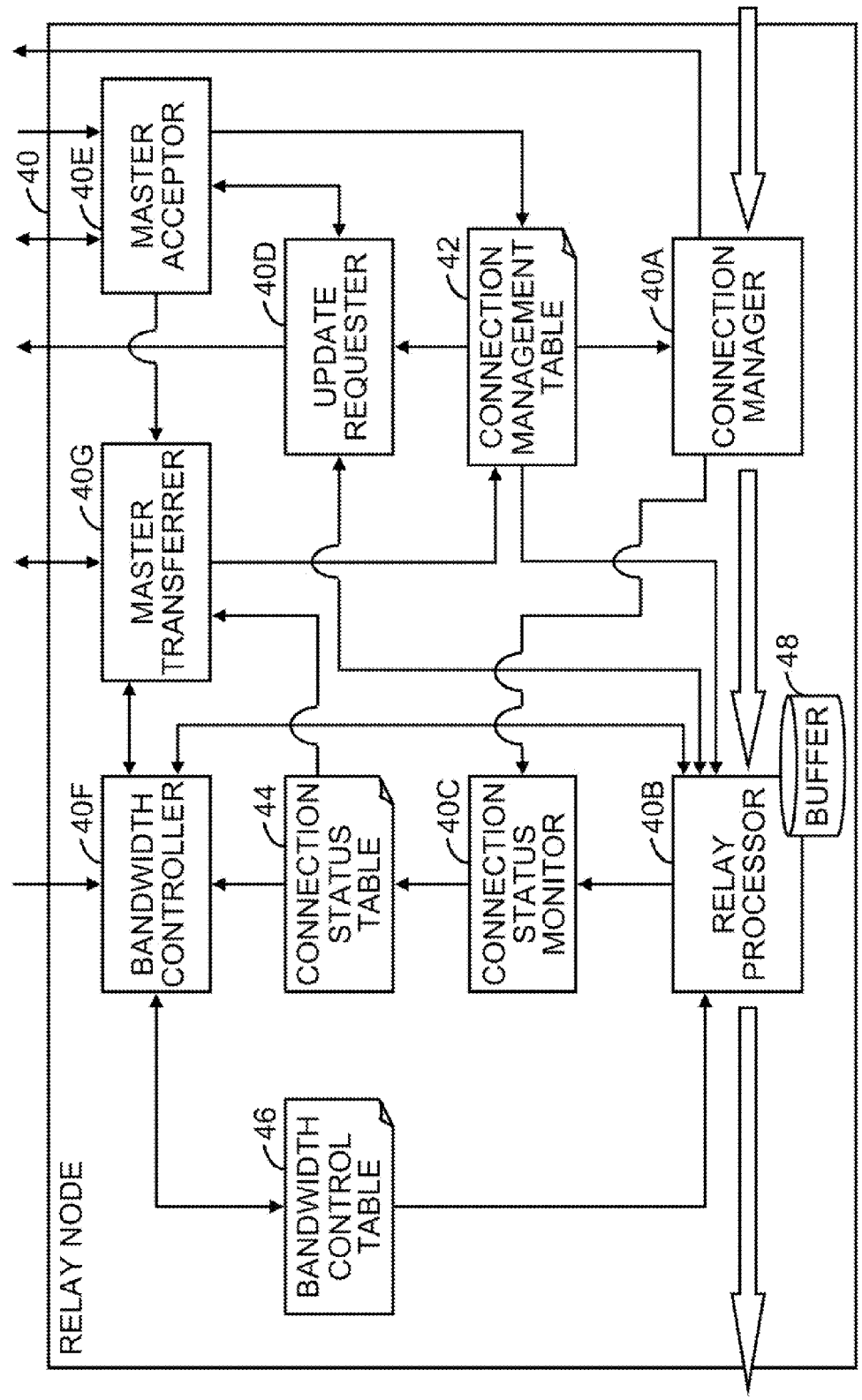
FIG. 2 is a diagram illustrating an exemplary functional configuration of a relay node according to an embodiment of the present invention.

FIG. 2 illustrates an exemplary functional configuration of the relay node 40 according to the present embodiment. As illustrated in FIG. 2, the relay node 40 stores a connection management table 42, a connection status table 44, and a bandwidth control table 46 in a high-speed storage medium such as the RAM. The connection management table 42 is a table for managing information regarding to the client 10 and the server 50 as well as the relay node 40 (master node) functioning as the master node in respective connections belonging to a connection group including a control connection and a data connection. Herein, the master node is a node that performs a centralized management on the bandwidth control table 46 serving as the control data for a relay process among the plurality of relay nodes 40. FIG. 3 illustrates an example of the connection management table 42 according to the present embodiment. As illustrated in FIG. 3, a record of the connection management table 42 includes a "client internet protocol address (hereinafter, referred to as client IP)" field 421, a "server internet protocol address (hereinafter, referred to as server IP)" field 422, a "client port" field 423, a "server port" field 424, a "connection group identifier (ID)" field 425, a "master node" field 426, and a "connection type" field 427. The "master node" field 426 of the connection management table 42 is, for example, blank when the relay node 40 functioning as the master node is not determined. The connection status table 44 is a table for managing a connection status of a connection belonging to each connection group. FIG. 4 illustrates an example of the connection status table 44 according to the present embodiment. As illustrated in FIG. 4, a record of the connection status table 44 includes a "connection group ID" field 441, a "client IP" field 442, a "server IP" field 443, a "client port" field 444, a "server port" field 445, and a "connection status" field 446. The bandwidth control table 46 is a table shared among the plurality of relay nodes 40 for carrying out the bandwidth control on the network for each connection of the connection group. FIG. 5 illustrates an example of the bandwidth control table 46 according to the present embodiment. As illustrated in FIG. 5, a record of the bandwidth control table 46 includes a "connection group ID" field 461, an "outgoing bytes (per unit time)" field 462, and a "reference time" field 463.

As illustrated in FIG. 2, the relay node 40 performs each of the functions of a connection manager 40A, a relay processor 40B, a connection status monitor 40C, an update requester 40D, a master acceptor 40E, a bandwidth controller 40F, and a master transferrer 40G, by executing a relay process program. The relay process program is installed into a storage such as the HDD 1906 of the relay node 40 from a computer-readable recording medium 1906 such as a compact disc read only memory (CD-ROM) or a digital versatile disc read only memory (DVD-ROM) by using conventional means.

The connection manager 40A manages the connection by analyzing the packet arrived at the relay node 40. The relay processor 40B transmits the packet arrived at the relay node 40 to the distribution node 30 or the server 50. The connection status monitor 40C monitors a status of a connection and analyzes the header of the packet arrived at the relay node 40 to update the connection status table 44 for each connection. The update requester 40D requests the relay node 40 functioning as the master node to update the bandwidth control table 46. The master acceptor 40E performs various processes to prepare for the relay node 40 thereof to become the master node. The bandwidth controller 40F updates the bandwidth control table 46. The master transferrer 40G performs various processes for transferring the authority of the master node to another relay node 40. The relay node 40 also includes a buffer 48 for storing packets that are not transmitted when the relay processor 40B performs a bandwidth control.

Figure 6A:
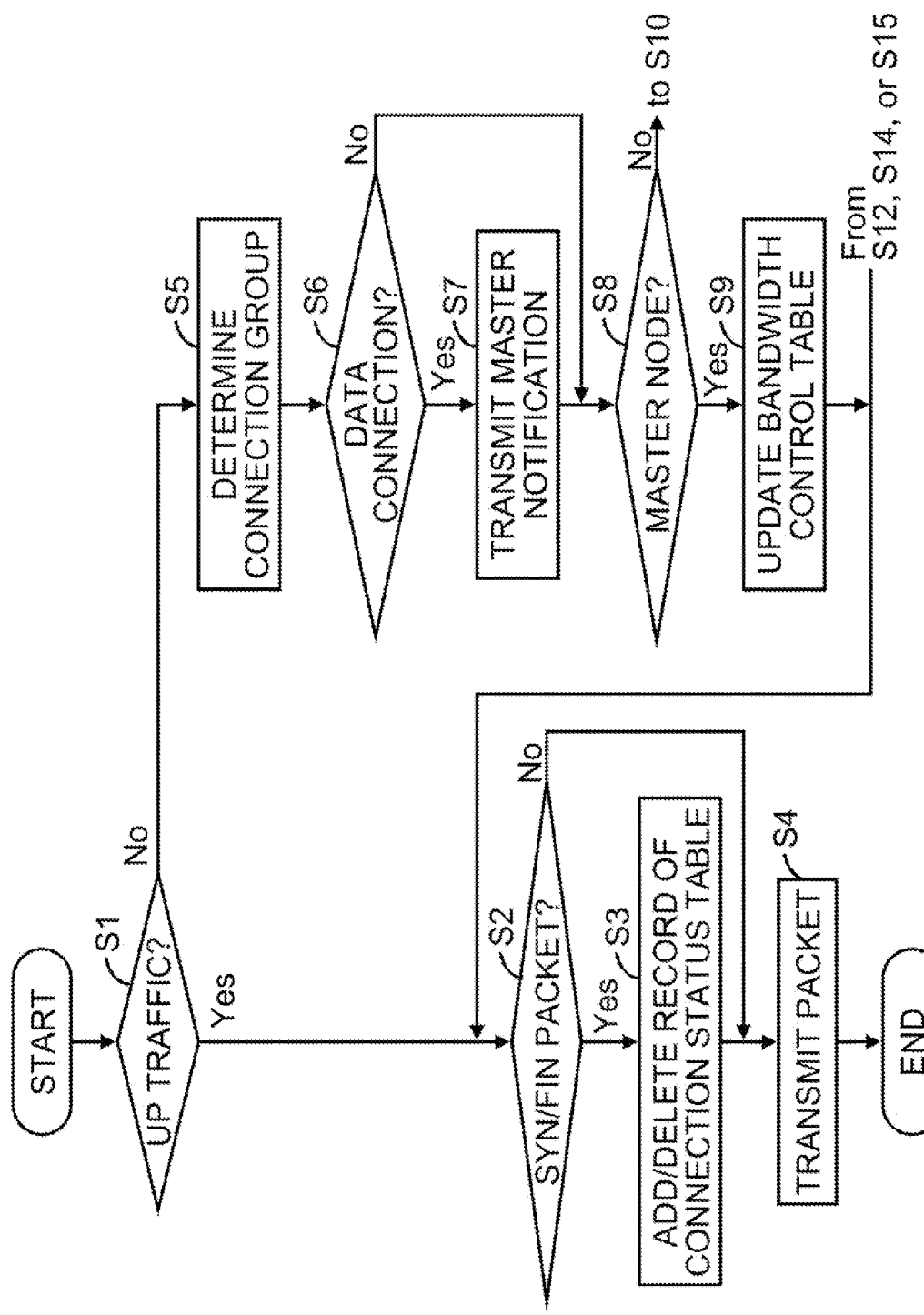
FIGS. 6A and 6B are diagrams illustrating an exemplary operation flow of a process executed by a relay node according to an embodiment of the present invention.
Figure 6B:
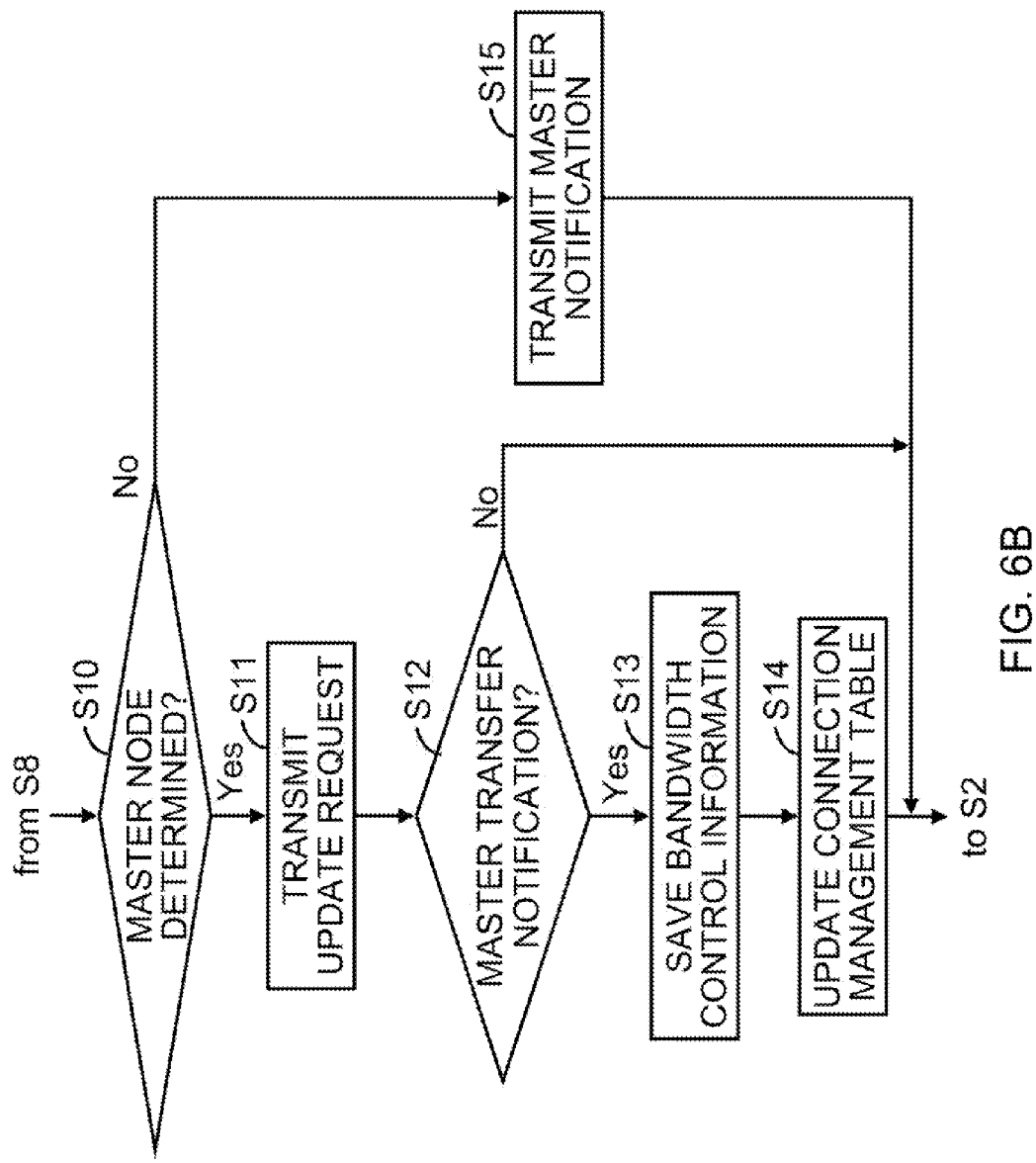

FIGS. 6A and 6B illustrate an exemplary operation flow of a process executed by the connection manager 40A, the relay processor 40B, the connection status monitor 40C, the update requester 40D, the master acceptor 40E, and the bandwidth controller 40F in cooperation when a packet arrives at the relay node 40.

In operation S1, the connection manager 40A refers to a sequence number in a transmission control protocol (TCP) header of an arrived packet, for example, to determine whether the packet is an up traffic flowing from the client 10 to the server 50. When it is determined that the packet is the up traffic (operation S1: "Yes"), the connection manager 40A advances the process to operation S2. When it is determined that the packet is a down traffic flowing from the server 50 to the client 10 (operation S1: "No"), the connection manager 40A advances the process to operation S5.

In operation S2, the connection status monitor 40C refers to a control flag in the TCP header, for example, to determine whether the packet is a synchronize (SYN) packet for establishing a connection or a finish (FIN) packet for terminating a connection. When it is determined that the packet is the SYN packet or the FIN packet (operation S2: "Yes"), the connection status monitor 40C advances the process to operation S3.

When it is determined that the packet is neither the SYN packet nor the FIN packet (operation S2: "No"), the connection status monitor 40C advances the process to operation S4.

In operation S3, the connection status monitor 40C updates the connection status table 44 for the connection group identified by the client IP, the client port, the server IP, and the server port specified in the packet. That is, when the packet is the SYN packet, the connection status monitor 40C adds a new record, and when the packet is the FIN packet, the connection status monitor 40C deletes a relevant record.

In operation S4, the relay processor 40B transmits the packet to the server 50 when the packet is the up traffic. The relay processor 40B transmits the packet to the distribution node 30 when the packet is the down traffic. Herein, the relay processor 40B refers to the bandwidth control table 46 to perform a conventional bandwidth control for the down traffic with large traffic amount. The packets that are not transmitted due to the bandwidth control are stored in the buffer 48 in the order of arrival.

In operation S5, the connection manager 40A refers to the connection management table 42 to determine a connection group identified by the client IP, the client port, the server IP, and the server port specified in the packet.

In operation S6, the connection manager 40A refers to the connection management table 42 to determine whether the packet includes a command indicating the server IP and the server port for the data connection. When it is determined that the packet includes the command indicating the server IP and the server port for the data connection (operation S6: "Yes"), the connection manager 40A advances the process to operation S7. When it is determined that the packet does not include the command indicating the server IP and the server port for the data connection (operation S6: "No"), the connection manager 40A advances the process to operation S8.

In operation S7, the connection manager 40A transmits a notification (master notification), for notifying that the relay node 40 thereof is the master node, to the other relay nodes 40. The master notification includes information capable of identifying the connection group, i.e., information specifying the client IP, the client port, the server IP, and the server port.

In operation S8, the relay processor 40B refers to the connection management table 42 to determine whether the relay node 40 thereof is the master node. When it is determined that the relay node 40 thereof is the master node (operation S8: "Yes"), the relay processor 40B advances the process to operation S9. When it is determined that the relay node 40 thereof is not the master node, i.e., the relay node is a slave node (operation S8: "No"), the relay processor 40B advances the process to operation S10.

In operation S9, the bandwidth controller 40F updates the bandwidth control table 46 for the connection group identified by the client IP, the client port, the server IP, and the server port specified in the packet. That is, the bandwidth controller 40F adds the byte size of the packet to the value stored in the "outgoing bytes" field 462. When the value stored in the "outgoing bytes" field 462 exceeds a predefined upper limit, transmission of the packet is suspended until the reference time specified in the "reference time" field 463. At the reference time, the bandwidth controller 40F resets the value stored in the "outgoing bytes" field 462 and increments the reference time specified in the "reference time" field 463 by a bandwidth control interval, for example, one second (hereinafter, the same applies). Thereafter, the bandwidth controller 40F advances the process to operation S2.

In operation S10, the update requester 40D refers to the connection management table 42 to determine whether the master node has been determined for the connection group identified by the client IP, the client port, the server IP, and the server port specified in the packet. When it is determined that the master node has been determined (operation S10: "Yes"), the update requester 40D advances the process to operation S11. When it is determined that the master node has not been determined (operation S10: "No"), the update requester 40D advances the process to operation S15.

In operation S11, the update requester 40D transmits an update request for updating the bandwidth control table 46 to the relay node 40 functioning as the master node. The update request includes information capable of identifying the connection group related to the update, i.e., information specifying the client IP, the client port, the server IP, and the server port. The update requester 40D stands by for receiving a response from the relay node 40 functioning as the master node.

In operation S12, the master acceptor 40E determines whether the response to the update request includes a master transfer notification indicating that the authority of the master node is to be transferred. When it is determined that the response includes the master transfer notification (operation S12: "Yes"), the master acceptor 40E advances the process to operation S13. When it is determined that the response does not include the master transfer notification (operation S12: "No"), the master acceptor 40E advances the process to operation S2.

In operation S13, the master acceptor 40E saves bandwidth control information included in the response in the bandwidth control table 46. That is, the master acceptor 40E allows the relay node 40 thereof to operate as the master node by taking over the bandwidth control information notified from the relay node 40 which is the former master node.

In operation S14, the master acceptor 40E updates the connection management table 42. That is, the master acceptor 40E writes information indicating that the relay node 40 thereof becomes the master node in the connection management table 42. Thereafter, the master acceptor 40E advances the process to operation S2.

In operation S15, the master acceptor 40E transmits the master notification notifying that the relay node 40 thereof is the master node to the other relay nodes 40. Thereafter, the master acceptor 40E advances the process to operation S2.

According to the above-mentioned process triggered by arrival of a packet, when the packet is the down traffic and the interested relay node 40 itself is the master node, the interested relay node 40 updates the bandwidth control table 46 for performing the bandwidth control. When the packet is the down traffic and the interested relay node 40 itself is a slave node, the interested relay node 40 executes the following processes in accordance with whether the master node has been determined. That is, when the master node has been determined, the interested relay node 40 transmits an update request to a relay node 40 functioning as the master node and the interested relay node 40 carries out various processes to become the master node upon receiving a master transfer notification as a response to the update request. When the master node has not been determined, the interested relay node 40 notifies the other relay nodes 40 that the interested relay node 40 becomes the master node. Then, irrespective of the packet and the interested relay node 40 itself, the interested relay node 40 updates the connection status table 44 when needed, and transmits the packet to the distribution node 30 or the server 50.

FIG. 7 illustrates an exemplary operation flow of a process executed by the bandwidth controller 40F and the master transferrer 40G in cooperation when an update request arrives at the relay node 40.

In operation S21, the bandwidth controller 40F updates the bandwidth control table 46 for the connection group identified by the client IP, the client port, the server IP, and the server port specified in the update request. That is, the bandwidth controller 40F adds the byte size of the packet to the value stored in the "outgoing bytes" field 462.

In operation S22, the master transferrer 40G refers to the connection status table 44 to determine whether the relay node 40 thereof has an established connection belonging to the connection group identified by the client IP, the client port, the server IP, and the server port specified in the update request, that is, whether the relay node 40 thereof is monitoring some connection belonging to the connection group. When it is determined that the relay node 40 thereof does not have an established connection (operation S22: "No"), the master transferrer 40G advances the process to operation S23. When it is determined that the relay node 40 thereof has an established connection (operation S22: "Yes"), the master transferrer 40G advances the process to operation S25.

In operation S23, the master transferrer 40G transmits a master transfer notification to the relay node 40 that has transmitted the update request. The master transfer notification includes the bandwidth control information capable of reproducing the bandwidth control table 46 as well as information capable of identifying the connection group, i.e., information specifying the client IP, the client port, the server IP, and the server port.

In operation S24, the master transferrer 40G transmits a master change notification, notifying that the master node is to be changed, to the other relay nodes 40 except for the relay node 40 that has transmitted the update request.

In operation S25, the master transferrer 40G transmits to the relay node 40 that has transmitted the update request a response to instruct the relay node 40 to proceed.

According to the above-mentioned process triggered by arrival of the update request, the interested relay node 40 functioning as the master node updates the bandwidth control table 46 in response to the update request. When the interested relay node 40 functioning as the master node does not have an established connection, the interested relay node 40 notifies the relay node 40 that has transmitted the update request that the authority of the master node is to be transferred, and notifies the other relay nodes 40 that the master node is to be changed. When the interested relay node 40 functioning as the master node has an established connection, the interested relay node 40 transmits a response to the relay node 40 that has transmitted the update request.

FIG. 8 illustrates an exemplary operation flow of a process executed by the master acceptor 40E when the master notification arrives at the relay node 40.

In operation S31, the master acceptor 40E registers in the "master node" field 426 of the connection management table 42 the master node for the connection group identified by the client IP, the client port, the server IP, and the server port specified in the master notification. That is, the master acceptor 40E registers the notified master node in the connection management table 42.

According to the process triggered by arrival of the master notification, the interested relay node 40 registers the master node in the connection management table 42 upon receiving the master notification.

Therefore, when the interested relay node 40 functioning as the master node does not have an established connection when updating the bandwidth control table 46, the interested relay node 40 transfers the authority of the master node to the relay node 40 that has transmitted the update request. For this reason, from the viewpoint of the entire information system, the relay node 40 that becomes the master node apparently switches gradually in accordance with the change in the packet amount when the master node receives an update request. As the relay node 40 functioning as the master node decides the new master node, two or more relay nodes 40 do not become the master nodes at the same time with respect to one connection group. Thus, the number of update requests flowing through the network may be decreased and the overhead in the data communication may be reduced.

Figure 9A:
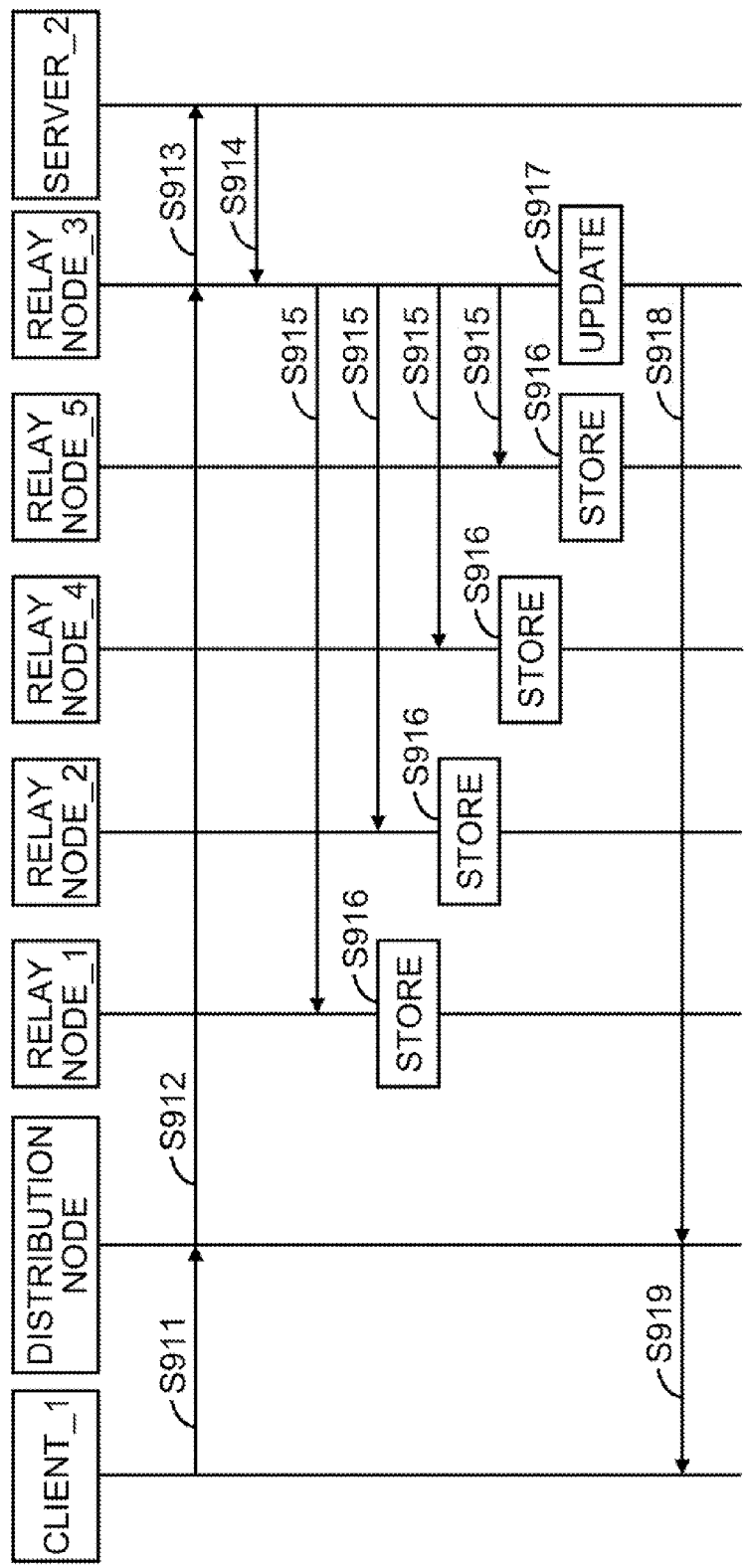
FIGS. 9A, 9B, and 9C are diagrams illustrating exemplary time sequences of communication.
Figure 9B:
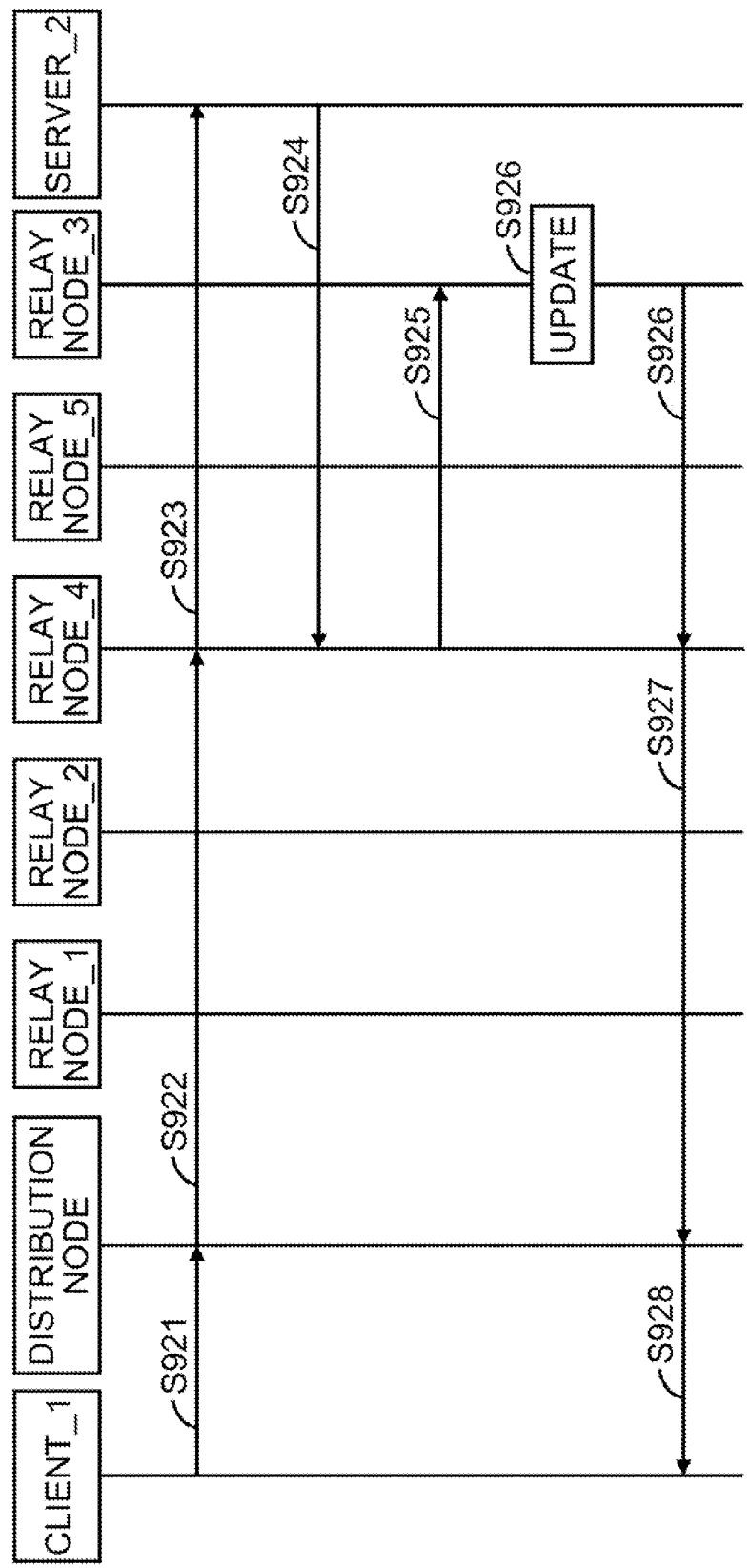
Figure 9C:
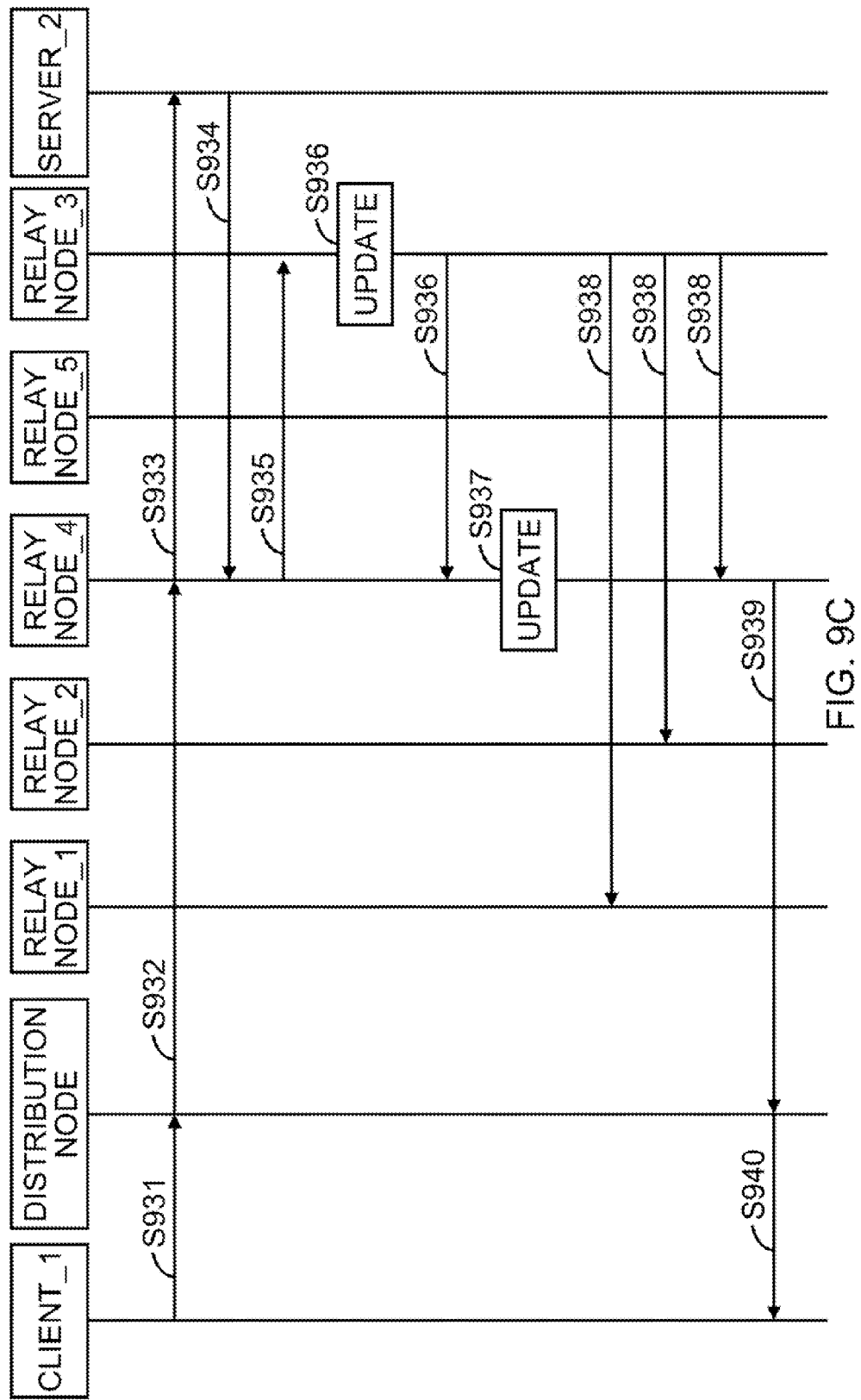

Herein, for the purpose of facilitating the understanding of the embodiments, communication examples in specific cases will be discussed with reference to FIGS. 9A, 9B, and 9C.

First Communication Example

Communication Through Control Connection

It is assumed that the client_1 creates a TCP control connection with the server_2, and that the distribution node 30 distributes packets to the relay node_3 functioning as the master node. It is also assumed that information on the control connection is previously stored in the connection management table 42. FIG. 9A illustrates an exemplary time sequence of the present communication example.

In operation S911, the client_1 transmits a passive (PASV) command based on file transfer protocol (FTP) to the server_2. At this time, the client_1 transmits a packet of a control connection (specifying client IP="10.0.0.1", server IP="20.0.0.1", client port="23435", and server port="21").

In operation S912, the distribution node 30 transmits the packet to the relay node_3.

In operation S913, as the packet is the up traffic, the relay node_3 transmits the packet to the server_2.

In operation S914, the server_2 transmits a response to the PASV command based on FTP. At this time, the server_2 transmits a character string of "227 Entering Passive Mode (20.0.0.1, 156, 115)".

In operation S915, the relay node_3 analyses the response message from the server_2 and determines that the connection in which the server IP is 20.0.0.1 and the server port is 40051 (156×256+115) is a data connection corresponding to the control connection. Then, the relay node_3 notifies the other relay nodes 40 (relay node_1, relay node_2, relay node_4, and relay node_5) that the relay node_3 is the master node.

In operation S916, the other relay nodes 40 (relay node_1, relay node_2, relay node_4, and relay node_5) store information indicating that the relay node_3 is the master node in the connection management table 42.

In operation S917, as relay node_3 itself is the master node, the relay node_3 updates the bandwidth control table 46.

In operation S918, as the packet does not indicate establishment or termination of a connection, the relay node_3 transmits the packet as it is to the client_1.

In operation S919, the client_1 receives the packet transmitted from the relay node_3 as an FTP response.

Second Communication Example

Communication Through Data Connection, without Transferring the Authority of the Master Node It is assumed that the client_1 has received the packet discussed in the first communication example, and that a TCP connection (data connection) to the specified server IP and the specified server port has been created as a data connection.

In operation S921, the client_1 transmits an SYN packet based on TCP for creating a data connection to the server_2. At this time, the client_1 transmits a packet specifying client IP="10.0.0.1", server IP="20.0.0.1", client port="23436", and server port="40051".

In operation S922, as the packet transmitted from the client_1 to the server_2 is an SYN packet, the distribution node 30 determines a relay node 40 for a destination and transmits the packet. Herein, for example, the packet is transmitted to the relay node_4.

In operation S923, as a new connection is established by the SYN packet, the relay node_4 adds a new record specifying client IP="10.0.0.1", server IP="20.0.0.1", client port="23436", and server port="40051" to the connection status table 44. Then, the relay node_4 transmits the packet to the server_2.

In operation S924, the server_2 transmits an SYN/acknowledge (ACK) packet based on TCP as a response.

In operation S925, the relay node_4 reads out the record of the data connection from the connection management table 42 and recognizes that the data connection belongs to the group_1 and that the relay node_3 is the master node. As the relay node_4 itself is not the master node, the relay node_4 transmits an update request to the relay node_3 functioning as the master node. Herein, the update request includes the connection group ID and the byte size of the packet.

In operation S926, the relay node_3 receives the update request from the relay node_4 and updates the bandwidth control table 46. At this time, as a status of the data connection belonging to the group_1 has been established, the relay node_3 determines not to transfer the authority of the master node and transmits a response to the relay node_4.

In operation S927, as the packet does not indicate establishment or termination of a connection, the relay node_4 transmits the packet as it is to the client_1.

In operation S928, the client_1 receives the packet transmitted from the relay node_4 as a response packet to the SYN packet based on TCP.

Third Communication Example

Communication Through Data Connection, with Transferring the Authority of the Master Node It is assumed that after the control connection of the relay node_3 functioning as the master node is terminated by an FIN packet based on TCP, a communication through a data connection is performed. It is also assumed as the result of processing in response to the FIN packet based on TCP, that the relay node_3 recognizes that the status of the control connection changes and that the relevant record of the connection status table 44 has been deleted.

In operation S931, the client_1 transmits an FTP packet to the server_2. At this time, the client_1 transmits a packet specifying client IP="10.0.0.1", server IP="20.0.0.1", client port="23436", and server port="40051".

In operation S932, the distribution node 30 distributes the packet to the relay node_4.

In operation S933, as the packet is the up traffic, the relay node_4 transmits the packet to the server_2.

In operation S934, after the FTP processing, the server_2 transmits a response packet.

In operation S935, the relay node_4 reads out the record of the data connection from the connection management table 42 and recognizes that the data connection belongs to the group_1 and that the relay node_3 is the master node. As the relay node_4 itself is not the master node, the relay node_4 transmits an update request to the relay node_3 functioning as the master node.

In operation S936, the relay node_3 receives the update request from the relay node_4 and updates the bandwidth control table 46. At this time, as the control connection belonging to the group_1 has already been terminated, the relay node_3 determines to transfer the authority of the master node and transmits a response to the relay node_4.

In operation S937, the relay node_4 is notified from the relay node_3 that the authority of the master node is to be transferred, and rewrites the "master node" field 426 of the connection management table 42 for the group_1 to the relay node_4. The relay node_4 also updates the bandwidth control table 46.

In operation S938, the relay node_3 notifies the other relay nodes 40 (relay node_1, relay node_2, and relay node_5) that the master node for the group_1 has been changed to the relay node_4. In a case where during a time period from start to completion of the transfer (referred to as master transfer) of the authority of the master node, the relay node_3 receives an update request from the other relay nodes 40 (relay node_1, relay node_2, and relay node_5), it may be possible to treat the update process requested during the master transfer if a procedure, for example, in which the update request is redirected to the relay node_4 is performed.

In operation S939, as the packet does not indicate establishment or termination of a connection, the relay node_4 transmits the packet as it is to the client_1.

In operation S940, the client_1 receives the response packet transmitted from the relay node_3.

Next, modified examples of the operations of the relay node will be discussed.

First Modified Example

According to the present modified example, the relay node 40 functioning as the master node transfers the authority of the master node to the relay node 40 functioning as a slave node that has transmitted the update request when no communication has been performed for a predefined time period (for example, 10 seconds). FIG. 10 illustrates an example of the connection status table 44 according to the present example. In this case, as illustrated in FIG. 10, a record of the connection status table 44 includes the "connection group ID" field 441, the "client IP" field 442, the "server IP" field 443, the "client port" field 444, the "server port" field 445, and a "last access time" field 447.

FIG. 11 illustrates an exemplary operation flow of a process executed by the connection manager 40A, the relay processor 40B, the connection status monitor 40C, the update requester 40D, the master acceptor 40E, and the bandwidth controller 40F in cooperation when a packet arrives at the relay node 40. As the present operation flow is common to the operation flow illustrated in FIG. 6A for the most part, only a different part will be discussed, and for the other part, see the discussion of FIGS. 6A and 6B (hereinafter, the same applies).

In operation S2, the connection status monitor 40C refers to a control flag of the TCP header, for example, to determine whether the packet is the SYN packet for establishing a connection or the FIN packet for terminating a connection. When it is determined that the packet is the SYN packet or the FIN packet (operation S2: "Yes"), the connection status monitor 40C advances the process to operation S41. When it is determined that the packet is neither the SYN packet nor the FIN packet (operation S2: "No"), the connection status monitor 40C advances the process to operation S42.

In operation S41, the connection status monitor 40C updates the connection status table 44 for the connection group identified by the client IP, the client port, the server IP, and the server port specified in the packet. That is, when the packet is the SYN packet, the connection status monitor 40C adds a new record, and when the packet is the FIN packet, the connection status monitor 40C deletes a relevant record.

In operation S42, the connection status monitor 40C updates the value stored in the "last access time" field 447 of the connection status table 44 for the connection group identified by the client IP, the client port, the server IP, and the server port specified in the packet.

FIG. 12 illustrates an exemplary operation flow of a process executed by the bandwidth controller 40F and the master transferrer 40G in cooperation when an update request arrives at the relay node 40. As the present operation flow is common to the operation flow illustrated in FIG. 7 for the most part, only a different part will be discussed. For the other part, see the discussion of FIG. 7.

In operation S22, the master transferrer 40G refers to the connection status table 44 to determine whether the relay node 40 thereof has an established connection belonging to the connection group identified by the client IP, the client port, the server IP, and the server port specified in the update request. When it is determined that the relay node 40 thereof does not have an established connection (operation S22: "No"), the master transferrer 40G advances the process to operation S23. When it is determined that the relay node 40 thereof has an established connection (operation S22: "Yes"), the master transferrer 40G advances the process to operation S43.

In operation S43, the master transferrer 40G refers to the "last access time" field 447 of the connection status table 44 to determine whether any communication has been performed for a predefined time period with regard to the currently established connection. When it is determined that no communication has been performed (operation S43: "No"), the master transferrer 40G advances the process to operation S23. When it is determined that some communication has been performed (operation S43: "Yes"), the master transferrer 40G advances the process to operation S25.

With this configuration, even in an application where the connection of the relay node 40 functioning as the master node is not actively terminated, when "no communication" state continues for a predefined time period, the master transfer is carried out. For this reason, as the authority of the master node is transferred to the relay node 40 where the packet arrives, the number of update requests flowing through the network may be decreased and the overhead in the data communication may be reduced.

Second Modified Example

According to the present modified example, when the relay node 40 functioning as the master node treats only the control connection based on FTP and a relay node 40 functioning as a slave node treats the data connection based on FTP, the relay node 40 functioning as the master node transfers the authority of the master node to the relay node 40 functioning as the slave node that has transmitted the update request. FIG. 13 illustrates an example of the connection status table 44 according to the present example. In this case, as illustrated in FIG. 13, a record of the connection status table 44 includes the "connection group ID" field 441, the "client IP" field 442, the "server IP" field 443, the "client port" field 444, the "server port" field 445, and a "protocol" field 448.

FIG. 14 illustrates an exemplary operation flow of a process executed by the connection manager 40A, the relay processor 40B, the connection status monitor 40C, the update requester 40D, the master acceptor 40E, and the bandwidth controller 40F in cooperation when a packet arrives at the relay node 40.

In operation S44, the connection status monitor 40C refers to a control flag of the TCP header of the packet, for example, to determine whether the packet is the SYN packet for establishing a connection. When it is determined that the packet is the SYN packet (operation S44: "Yes"), the connection status monitor 40C advances the process to operation S45. When it is determined that the packet is not the SYN packet (operation S44: "No"), the connection status monitor 40C advances the process to operation S46.

In operation S45, the connection status monitor 40C adds a new record to the connection status table 44 for the connection group identified by the client IP, the client port, the server IP, and the server port specified in the packet. At this time, the connection status monitor 40C determines the protocol on the basis of the port number of the server port, for example, and sets the protocol in the connection status table 44. To be more specific, as the port number of the control connection based on FTP is normally a fixed value ("21"), the connection status monitor 40C determines whether the protocol is FTP on the basis of whether the port number of the server port is "21".

In operation S46, the connection status monitor 40C refers to the control flag of the TCP header of the packet, for example, to determine whether the packet is the FIN packet for terminating a connection. When it is determined that the packet is the FIN packet (operation S46: "Yes"), the connection status monitor 40C advances the process to operation S47. When it is determined that the packet is not the FIN packet (operation S46: "No"), the connection status monitor 40C advances the process to operation S4.

In operation S47, the connection status monitor 40C deletes a relevant record of the connection status table 44 for the connection group identified by the client IP, the client port, the server IP, and the server port specified in the packet.

FIG. 15 illustrates an exemplary operation flow of a process executed by the bandwidth controller 40F and the master transferrer 40G in cooperation when an update request arrives at the relay node 40.

In operation S22, the master transferrer 40G refers to the connection status table 44 to determine whether the relay node 40 thereof has an established connection belonging to the connection group identified by the client IP, the client port, the server IP, and the server port specified in the update request. When it is determined that the relay node 40 thereof does not have an established connection (operation S22: "No"), the master transferrer 40G advances the process to operation S23. When it is determined that the relay node 40 thereof has an established connection (operation S22: "Yes"), the master transferrer 40G advances the process to operation S48.

In operation S48, the master transferrer 40G refers to the connection status table 44 to determine whether all the connections of the connection group managed by the relay node 40 thereof are the control connection based on FTP. When it is determined that all the connections of the connection group are the control connection based on FTP (operation S48: "Yes"), the master transferrer 40G advances the process to operation S23. When it is determined that a part of the connections of the connection group is not the control connection based on FTP (operation S48: "No"), the master transferrer 40G advances the process to operation S25.

With this configuration, even in an application where the traffic amount varies in accordance with protocols, the relay node 40 that treats the data connection having large communication amount is preferentially set as the master node. For this reason, the number of update requests flowing through the network may be decreased and the overhead in the data communication may be reduced.

Third Modified Example

According to the present modified example, the relay node 40 functioning as the master node calculates an expected data size of communication data, which is expected to be relayed by the relay node 4 subsequently, with reference to the Content-Length header, which indicates data size of the down traffic, included in a response message based on hypertext transfer protocol (HTTP) and transfers the authority of the master node in accordance with the expected data size. FIG. 16 illustrates an example of the connection status table 44 according to the present example. In this case, as illustrated in FIG. 16, a record of the connection status table 44 includes the "connection group ID" field 441, the "client IP" field 442, the "server IP" field 443, the "client port" field 444, the "server port" field 445, and an "expected data size" field 449.

The operation flow of the process executed by the connection manager 40A, the relay processor 40B, the connection status monitor 40C, the update requester 40D, the master acceptor 40E, and the bandwidth controller 40F in cooperation when the packet arrives at the relay node 40 is the same as that in FIGS. 6A and 6B except for operation S3 and operation S11.

In operation S3, the connection status monitor 40C updates the connection status table 44 for the connection group identified by the client IP, the client port, the server IP, and the server port specified in the packet. That is, when the packet is the SYN packet, the connection status monitor 40C adds a new record, and when the packet is the FIN packet, the connection status monitor 40C deletes a relevant record. When the response message includes the Content-Length header, the connection status monitor 40C also updates the value of the "expected data size" field 449 of the connection status table 44 on the basis of a value obtained by subtracting the packet size from the data size indicated by the Content-Length header. When the response message does not include the Content-Length header, the connection status monitor 40C subtracts the packet size from the value of the "expected data size" field 449 of the connection status table 44.

In operation S11, the update requester 40D transmits the update request for updating the bandwidth control table 46 to the relay node 40 functioning as the master node. At this time, the update requester 40D refers to the "expected data size" field 449 of the connection status table 44 to transmit the update request accompanied by information indicating a value obtained by adding the data size indicated by the Content-Length header to the expected data size.

FIG. 17 illustrates an exemplary operation flow of a process executed by the bandwidth controller 40F and the master transferrer 40G in cooperation when an update request arrives at the relay node 40.

In operation S22, the master transferrer 40G refers to the connection status table 44 to determine whether the relay node 40 thereof has an established connection belonging to the connection group identified by the client IP, the client port, the server IP, and the server port specified in the update request. When it is determined that the relay node 40 thereof does not have an established connection (operation S22: "No"), the master transferrer 40G advances the process to operation S23. When it is determined that the relay node 40 thereof has an established connection (operation S22: "Yes"), the master transferrer 40G advances the process to operation S49 (operation S22: "Yes").

In operation S49, the master transferrer 40G refers to the connection status table 44 to determine whether the expected data size in the slave node, which is indicated by the information accompanying the update request, is larger than the expected data size in the master node, i.e., the relay node 40 thereof, and larger than a predefined value (for example, 10 MB). When the expected data size in the slave node is larger than the expected data size in the master node and the predefined value (operation S49: "Yes"), the master transferrer 40G advances the process to operation S23. When the expected data size in the slave node is not larger than the expected data size in the master node and the predefined value (operation S49: "No"), the master transferrer 40G advances the process to operation S25.

With this configuration, when performing communication based on a protocol in which a communication data size is included in a header, it is possible to preferentially set the relay node 40 expected to have larger communication data size in the future as the master node. For this reason, the number of update requests flowing through the network may be decreased and it the overhead in the data communication may be reduced. At this time, as the condition for the master transfer includes that the expected data size in the relay node 40 functioning as a slave node is larger than the predefined value, frequent master transfer may be restrained and the increase in network load due to the master transfer may be suppressed.

When performing communication based on a protocol, not limited to HTTP, in which a data size is previously announced at the time of data transmission, such a configuration may be realized through a similar process by reading out the data size in accordance with the format of the protocol.

Fourth Modified Example

According to the present modified example, the relay node 40 functioning as the master node transfers the authority of the master node in accordance with expected data size with reference to a data size specified, for example, as "150 Opening BINARY mode data connection for bigdata.iso (685768704 bytes).", in a message based on FTP. In the present modified example, the table illustrated in FIG. 16 is utilized as the connection status table 44. The process performed when the update request arrives at the relay node 40 is the same as the third modified example.

Figure 18A:
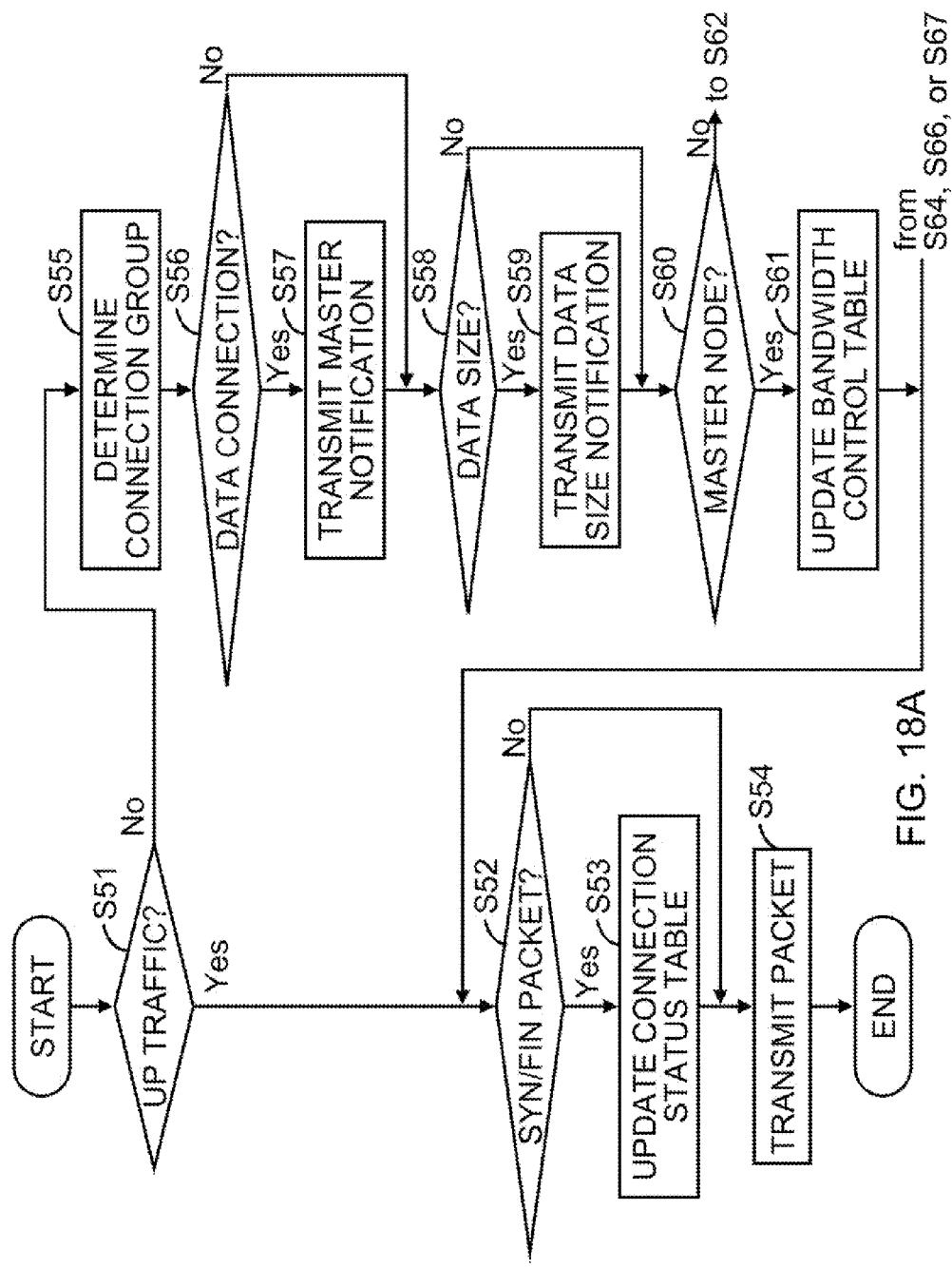
FIGS. 18A and 18B are diagrams illustrating an exemplary operation flow of a process executed by a relay node according to an embodiment of the present invention.
Figure 18B:
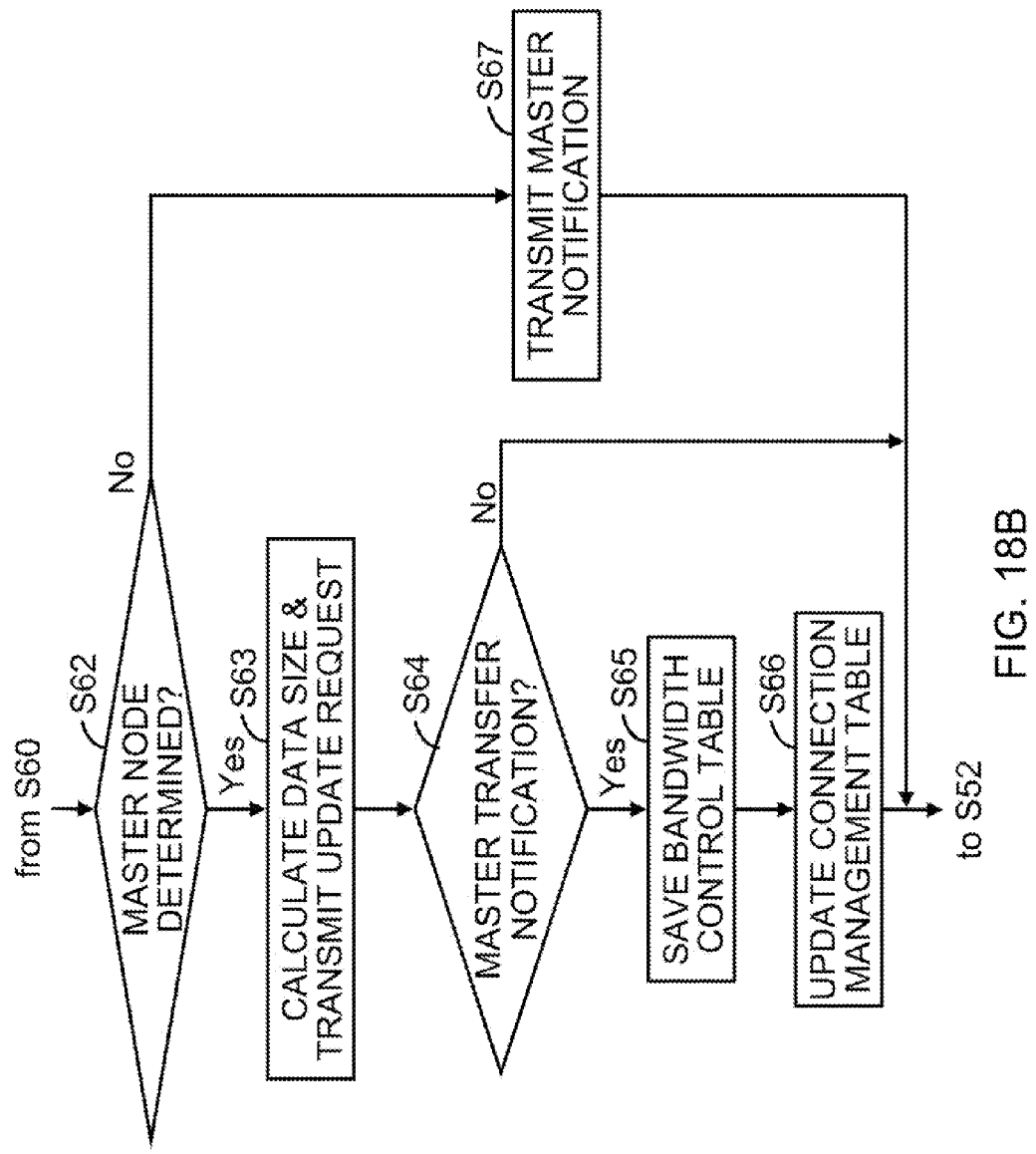

FIGS. 18A and 18B illustrate an exemplary operation flow of a process executed by the connection manager 40A, the relay processor 40B, the connection status monitor 40C, the update requester 40D, the master acceptor 40E, and the bandwidth controller 40F in cooperation when the packet arrives at the relay node 40. As the present operation flow is common to the operation flow illustrated in FIGS. 6A and 6B for the most part, the common operations will be only plainly discussed.

In operation S51, the connection manager 40A determines whether the packet is an up traffic. When it is determined that the packet is the up traffic (operation S51: "Yes"), the connection manager 40A advances the process to operation S52. When it is determined that the packet is a down traffic (operation S51: "No"), the connection manager 40A advances the process to operation S55.

In operation S52, the connection status monitor 40C determines whether the packet is an SYN packet for establishing a connection or an FIN packet for terminating a connection. When it is determined that the packet is the SYN packet or the FIN packet (operation S52: "Yes"), the connection status monitor 40C advances the process to operation S53. When it is determined that the packet is neither the SYN packet nor the FIN packet (operation S52: "No"), the connection status monitor 40C advances the process to operation S54.

In operation S53, the connection status monitor 40C updates the connection status table 44 for the connection group identified by the client IP, the client port, the server IP, and the server port specified in the packet. The connection status monitor 40C also updates the value stored in the "expected data size" field 449 of the connection status table 44 upon receiving a notification of the data size from other relay nodes 40.

In operation S54, the relay processor 40B transmits the packet of the up traffic to the server 50 and transmits the packet of the down traffic to the distribution node 30.

In operation S55, the connection manager 40A refers to the connection management table 42 to determine a connection group identified by the client IP, the client port, the server IP, and the server port specified in the packet.

In operation S56, the connection manager 40A refers to the connection management table 42 to determine whether the packet includes a command indicating the server IP and the server port for the data connection. When it is determined that the packet includes the command indicating the server IP and the server port for the data connection (operation S56: "Yes"), the connection manager 40A advances the process to operation S57. When it is determined that the packet does not include the command indicating the server IP and the server port for the data connection (operation S56: "No"), the connection manager 40A advances the process to operation S58.

In operation S57, the connection manager 40A transmits the master notification, for notifying that the relay node 40 thereof is the master node, to the other relay nodes 40.

In operation S58, the connection manager 40A determines whether the packet includes information indicating the data size. When it is determined that the packet includes information indicating the data size (operation S58: "Yes"), the connection manager 40A advances the process to operation S59. When it is determined that the packet does not include information indicating the data size (operation S58: "No"), the connection manager 40A advances the process to operation S60.

In operation S59, the connection manager 40A transmits to the other relay nodes 40 a notification (referred to as a data size notification) for notifying the other relay nodes 40 of the expected data size.

In operation S60, the relay processor 40B refers to the connection management table 42 to determine whether the relay node 40 thereof is the master node. When it is determined that the relay node 40 thereof is the master node (operation S60: "Yes"), the relay processor 40B advances the process to operation S61. When it is determined that the relay node 40 thereof is not the master node, i.e., the relay node 40 thereof is a slave node (operation S60: "No"), the relay processor 40B advances the process to operation S62.

In operation S61, the bandwidth controller 40F updates the bandwidth control table 46 for the connection group identified by the client IP, the client port, the server IP, and the server port specified in the packet. Thereafter, the bandwidth controller 40F advances the process to operation S52.

In operation S62, the update requester 40D refers to the connection management table 42 to determine whether the master node has been determined for the connection group identified by the client IP, the client port, the server IP, and the server port specified in the packet. When it is determined that the master node has been determined (operation S62: "Yes"), the update requester 40D advances the process to operation S63. When it is determined that the master node has not been determined (operation S62: "No"), the update requester 40D advances the process to operation S67.

In operation S63, the update requester 40D refers to the connection status table 44 to calculate the data size obtained by subtracting the packet size from the expected data size and transmits an update request for updating the bandwidth control table 46 to the relay node 40 functioning as the master node.

In operation S64, the master acceptor 40E determines whether the response to the update request includes a master transfer notification indicating that the authority of the master node is to be transferred. When it is determined that the response includes the master transfer notification (operation S64: "Yes"), the master acceptor 40E advances the process to operation S65. When it is determined that the response does not include the master transfer notification (operation S64: "No"), the master acceptor 40E advances the process to operation S52.

In operation S65, the master acceptor 40E saves the bandwidth control information included in the response in the bandwidth control table 46.

In operation S66, the master acceptor 40E writes information indicating that the relay node 40 thereof becomes the master node in the connection management table 42. Thereafter, the master acceptor 40E advances the process to operation S52.

In operation S67, the master acceptor 40E transmits the master notification notifying that the relay node 40 thereof is the master node to the other relay nodes 40. Thereafter, the master acceptor 40E advances the process to operation S52.

With this configuration, similarly as in the third modified example, it is possible to preferentially set the relay node 40 expected to have larger communication data size in the future as the master node. For this reason, the number of update requests flowing through the network may be decreased and the overhead in the data communication may be reduced. At this time, as the condition for the master transfer includes that the expected data size in the relay node 40 functioning as a slave node is larger than the predefined value, frequent master transfer may be restrained and the increase in network load due to the master transfer may be suppressed.

The relay node 40 may be, not limited to a bandwidth control apparatus, various apparatuses, such as a DoS monitoring apparatus and an access control apparatus, that perform the relay process while monitoring the traffic flowing through the network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been discussed in detail, it should be understood that the various changes, substitutions, and alterations could be made hereto without departing from the spirit and scope of the invention.

What is claimed is:

1. A relay node for managing control data for relaying communication data, the relay node comprising:

a processor configured to:
  perform functions of a master node after authority of a master node is transferred to the relay node;
  perform functions of a slave node after the relay node transfers the authority to another node;
  monitor a status of a connection belonging to a connection group related to the communication data;
  transmit a first update request to a first node, functioning as the master node, upon the relay node receiving first communication data while the relay node functioning as the slave node, the first update request requesting to update first control data for relaying the first communication data;
  determine whether to transfer the authority transferred to the relay node to a second node in accordance with a status of a first connection belonging to a first connection group related to second communication data upon the relay node receiving a second update request from the second node while the relay node functioning as the master node, the second node functioning as the slave node, the second update request requesting to update second control data for relaying the second communication data;
    transmit a first master transfer notification to the second node upon determining to transfer the authority transferred to the relay node to the second node, the first master transfer notification indicating that the authority transferred to the relay node is to be transferred to the second node; and
  prepare for the relay node to become the master node upon the relay node receiving a second master transfer notification while the relay node functioning as the slave node, the second master transfer notification indicating that authority of the master node is to be transferred to the relay node.

2. The relay node according to claim 1, wherein the processor determines to transfer the authority transferred to the relay node to the second node when the status monitoring means does not monitor the first connection.

3. The relay node according to claim 1, wherein the processor determines to transfer the authority transferred to the relay node to the second node when no communication through the first connection is performed for more than a predetermined time period.

4. The relay node according to claim 1, wherein each connection group includes a data connection and a control connection, and the processor determines to transfer the authority transferred to the relay node to the second node upon the relay node receiving the second update request from the second node treating a data connection belonging to the first communication group while the relay node not treating a data connection belonging to the first communication group but treating a control connection belonging to the first communication group.

5. The relay node according to claim 1,
  wherein the processor calculates an expected data size of communication data to be relayed subsequently by the relay node based on a data size of received communication data,
  the second update request is accompanied by information indicating an expected data size of communication data to be relayed subsequently by the second node, and
  the processor determines to transfer the authority transferred to the relay node to the second node when the expected data size of communication data to be relayed by the second node is larger than the expected data size of communication data to be relayed by the relay node.

6. The relay node according to claim 5, wherein the processor determines to transfer the authority transferred to the relay node to the second node when the expected data size of communication data to be relayed by the second node is larger than a predefined value.

7. A relay node for managing control data for relaying communication data, the relay node comprising:
  a processor configured to perform functions of a master node after authority of a master node is transferred to the relay node, perform functions of a slave node after the relay node transfers the authority to another node, and execute a procedure, the procedure comprising:
    monitoring a status of a connection belonging to a connection group related to the communication data;
    transmitting a first update request to a first node, functioning as the master node, upon receiving first communication data while the relay node functioning as the slave node, the first update request requesting to update first control data for relaying the first communication data;
    determining whether to transfer the authority transferred to the relay node to a second node in accordance with a status of a first connection belonging to a first connection group related to second communication data upon receiving a second update request from the second node while the relay node functioning as the master node, the second node functioning as the slave node, the second update request requesting to update second control data for relaying the second communication data;
    transmitting a first master transfer notification to the second node upon determining to transfer the authority transferred to the relay node to the second node, the first master transfer notification indicating that the authority transferred to the relay node is to be transferred to the second node; and
    preparing to become the master node upon receiving a second master transfer notification while the relay node functioning as the slave node, the second master transfer notification indicating that authority of the master node is to be transferred to the relay node.

8. The relay node according to claim 7, wherein the procedure further comprises determining whether to transfer the authority transferred to the relay node to the second node when the first connection is not monitored.

9. The relay node according to claim 7, wherein the procedure further comprises determining whether to transfer the authority transferred to the relay node to the second node when no communication through the first connection is performed for more than a predetermined time period.

10. The relay node according to claim 7, wherein each connection group includes a data connection and a control connection, and the procedure further comprises determining whether to transfer the authority transferred to the relay node to the second node upon the relay node receiving the second update request from the second node treating a data connection belonging to the first communication group while the relay node not treating a data connection belonging to the first communication group but treating a control connection belonging to the first communication group.

11. The relay node according to claim 7, wherein the procedure further comprises calculating an expected data size of communication data to be relayed subsequently by the relay node on the basis of a data size of received communication data, the second update request is accompanied by information indicating an expected data size of communication data to be relayed subsequently by the second node, and the procedure further comprises determining whether to transfer the authority of the master node to the second node when the expected data size of communication data to be relayed by the second node is larger than the expected data size of communication data to be relayed by the relay node.

12. The relay node according to claim 11, wherein the procedure further comprises determining whether to transfer the authority transferred to the relay node to the second node when the expected data size of communication data to be relayed by the second node is larger than a predefined value.

13. A computer-readable, non-transitory medium storing a program causing a computer configured to perform functions of a master node after authority of a master node is transferred to the relay node, perform functions of a slave node after the relay node transfers the authority to another node, and execute a procedure for managing control data for relaying communication data, the procedure comprising:

monitoring a status of a connection belonging to a connection group related to the communication data;

transmitting a first update request to a first node, functioning as the master node, upon receiving first communication data while the computer functioning as the slave node, the first update request requesting to update first control data for relaying the first communication data;

determining whether to transfer the authority transferred to the relay node to a second node in accordance with a status of a first connection belonging to a first connection group related to second communication data upon receiving a second update request from the second node while the computer functioning as the master node, the second node functioning as the slave node the second update request requesting to update second control data for relaying the second communication data;

transmitting a first master transfer notification to the second node upon determining to transfer the authority transferred to the relay node to the second node, the first master transfer notification indicating that the authority transferred to the relay node is to be transferred to the second node; and preparing to become the master node upon receiving a second master transfer notification while the computer functioning as the slave node, the second master transfer notification indicating that authority of the master node is to be transferred to the computer.

14. A method executed by a relay node of managing control data for relaying communication data, the method comprising:

monitoring a status of a connection belonging to a connection group related to the communication data;

transmitting a first update request to a first node, functioning as the master node, upon receiving first communication data while the relay node functioning as a slave node, the first update request requesting to update first control data for relaying the first communication data;

determining, by the relay node, whether to transfer the authority transferred to the relay node to a second node in accordance with a status of a first connection belonging to a first connection group related to second communication data upon receiving a second update request from the second node while the relay node functioning as the master node, the second node functioning as the slave node, the second update request requesting to update second control data for relaying the second communication data;

transmitting a first master transfer notification to the second node upon determining to transfer the authority transferred to the relay node to the second node, the first master transfer notification indicating that the authority transferred to the relay node is to be transferred to the second node; and preparing to become the master node upon receiving a second master transfer notification while the relay node functioning as the slave node, the second master transfer notification indicating that authority of the master node is to be transferred to the relay node.

* * * * *